United States Patent [19]

Aumann

[11] 4,186,569
[45] Feb. 5, 1979

[54] DUAL SPRING DRILL STRING SHOCK ABSORBER

[75] Inventor: James T. Aumann, Salt Lake City, Utah

[73] Assignee: Christensen, Inc., Salt Lake City, Utah

[21] Appl. No.: 879,237

[22] Filed: Feb. 21, 1978

[51] Int. Cl.² ............................. F16D 3/06; E21B 7/42
[52] U.S. Cl. .......................................... 64/23; 175/321
[58] Field of Search ........................ 64/23; 175/321; 267/125, 136, 137, 24, 31, 118

[56] References Cited

U.S. PATENT DOCUMENTS

| | | | |
|---|---|---|---|
| 2,712,435 | 7/1955 | Allen | 267/137 |
| 3,311,180 | 3/1967 | Gilreath | 64/23 |
| 3,382,936 | 5/1968 | Galle | 64/23 |
| 3,447,797 | 6/1969 | Roberts | 267/34 |
| 3,770,232 | 11/1973 | Blake | 267/136 |
| 3,834,472 | 9/1974 | Perkins | 267/125 |
| 3,884,051 | 5/1975 | Bottoms | 64/23 |
| 3,949,150 | 4/1976 | Mason | 175/321 |
| 3,998,433 | 12/1976 | Webb | 175/322 |

Primary Examiner—Charles J. Myhre
Assistant Examiner—R. C. Turner
Attorney, Agent, or Firm—Subkow and Kriegel

[57] ABSTRACT

A drill string shock absorber has a dual spring system for absorbing vibrations and shock loads during rotary well bore drilling operations. A first spring acts in compression when sufficient weight is set down on the drill bit through the shock absorber to overcome the fluid pressure forces tending to extend the shock absorber, and a second spring acts in compression when the weight applied to the bit through the shock absorber does not overcome the fluid pressure forces. A splined connection transmits torque to the shock absorber during drilling operations, and seals are provided between the telescopic shock absorber components for confining therein a body of lubricant, the pressure of which is equalized with the pressure of drilling fluid flowing through the shock absorber.

29 Claims, 10 Drawing Figures

DUAL SPRING DRILL STRING SHOCK ABSORBER

In the drilling of wells, such as oil or gas wells, utilizing the rotary drilling method, the drill bit is connected to the lower end of a string of drill pipe and heavy drill collars and rotated by a rotary drive unit on the drilling rig or platform, or by a fluid motor above the bit, to cause penetration of the bit into or through the earth formation. The weight applied to the bit determines its rate of penetration, but the tendency of the bit to jump off the bottom of the hole and cause variation in the effective weight on the bit can result in reduced penetration rate as well as deleterious effects upon the drill bit and upon the connections in the drill collar and drill pipe string. Drilling fluid is circulated downwardly through the drill pipe and drill collar string, and is jetted through the bit, returning to the top of the bore hole through the annulus outside of the drill pipe and drill collar string to flush cuttings from the annulus. The typical drilling bit is provided with orifices or nozzles which cause a pressure drop as the drilling fluid exits from the bit. As a result, there is a pressure differential between the pressure of drilling fluid within the drill pipe and drill collar string and the returning drilling fluid in the bore hole annulus.

It is common practice, particularly in areas of rough drilling, to install a shock absorber or vibration dampener in the drill string to absorb vibrations and shock loads imposed on the drill string and the bit which cause damage to the drill string connections and to the bit bearings and cutters. However, typically, such shock absorbers are effective only when sufficient weight is applied to the bit through the shock absorber to maintain a compressive force in the shock absorber over the full range of vibratory motion, unless the shock absorbing means can also function when the shock absorber structure is in tension.

In certain drilling operations, the maintenance on the bit of sufficient drilling weight through the shock aborber to maintain the spring means compressed over the full range of vibratory motion is difficult, if not impossible to accomplish. Such drilling operations include, for example, the drilling of a shallow hole or surface hole, certain reaming operations, wherein a previously drilled hole is being enlarged, and in certain directional drilling operations.

The usual shock absorber, according to the prior art, moreover, is a sealed structure enabling leak free circulation of drilling fluid through the shock absorber. As a result, the shock absorber structure may be exposed to substantial fluid pressure acting over a differential area between longitudinally spaced seals between the shock absorber mandrel or body and the shock absorber housing, or, in other situations, a drilling fluid responsive area exists in the shock absorber which is acted upon by the differential pressure of drilling fluid in the shock absorber tending to resist compression of the shock absorber spring means. In the first case, the shock absorber spring means may be substantially preloaded and thereby rendered more or less ineffective, whereas, in the second case, the weight of the drilling string above the shock absorber must overcome the net upward force applied thereto by the pressure of drilling fluid. Such differential pressure, the pressure inside the shock absorber in excess of the pressure in the annulus, may be sufficiently high, acting on the effective piston area of the shock absorber body, to produce a very substantial force resisting compression of the spring means. Thus, in the case of the usual shock absorber they are relatively ineffective when drilling with light weight upon the bit.

In order to provide drill string shock absorber structures which are operable both in compression and in tension, shock absorber structures have employed an elastomer, bonded between the shock absorber components to enable a certain amount of shock absorption when the shock absorber is in tension. In addition, steel springs have also been employed which have provided a coiled spring connected at its opposite ends to the respective telescopic shock absorber body and housing components so as to be operable in both compression and in tension. However, the problems of shock absorption or vibration dampening during lightweight drilling operations has remained a problem.

An example of a prior shock absorber device for drill strings having the problems described above is shown in U.S. Pat. No. 3,406,537, granted Oct. 22, 1968, to Falkner Jr. Another example is the "SHOCK-EZE" shock absorber of Christensen, Inc. shown in the composite catalog, Vol. 1, 1976-77, page 1563, published by World Oil, Houston, Texas.

The present invention relates to an improved shock absorber for rotary drill strings to absorb vibration and shock during drilling under the full range of drill string weight applied to the bit, regardless of whether the shock absorber is operating under compression or under tension, that is, whether or not the weight applied to the shock absorber by the upwardly extended drill string exceeds the force derived from drilling fluid pressure acting to extend the shock absorber.

More particularly, the invention provides a drill string shock absorber which is operable in tension or compression by utilizing separate spring means, one spring means acting when the shock absorber is under compression due to high weight on the bit applied through the shock absorber, the other spring means acting when the shock absorber is under tension, due to relatively low weight applied to the shock absorber and, less than necessary to overcome the force of fluid pressure acting to extend the shock absorber.

In accomplishing the foregoing, a shock absorber is provided wherein a male body structure is reciprocably disposed in an elongated housing structure, the two structures being adapted for connecting in the rotary drill string, and having rotary drive means slidably engaged between the body and the housing structures for the transmission of drilling torque. First and second spring means are engaged with opposing shoulders on the body and housing structures and resiliently resist relative longitudinal movement of the body and the housing structures in opposite directions.

Since drilling tools of the telescopic type, in general, as well as of the shock absorbing type, involve elongated, relatively thin walled sections, as compared with drill collars, the structure of the invention is such that the body and the housing have sliding engagement at longitudinally spaced locations, affording space for the spring units, while reducing bending tendencies, which might otherwise cause deviation in the direction in which the bore hole progresses.

In addition, the body structure has a passage therethrough for the flow of drilling fluid, and the body is sealed in the housing so that the body in the housing has an area responsive to the pressure of drilling fluid in the housing biasing the housing and body longitudinally in one direction to load one of the spring means when such pressure prevents loading of the other spring means.

More specifically, the structure of the invention enables utilization of selected spring units with selected similar or dissimilar spring rates and/or stroke. The spring units or separate spring means act in compression, under both conditions of tension or compression of the body and the housing, thus enabling use of efficient spring unit structures, employing the desirable compression characteristics of springs such as dished springs or Belleville springs.

The structure is one which can enable preloading the spring units against one another, eliminating free travel within the shock absorber when the body and the housing are in a neutral condition, with no net force tending to cause relative longitudinal movement of the body and the housing.

The invention is incorporated in an oil or hydraulic fluid filled structure, defined between the inner body and outer housing by a sealing means at one end of the structure and by a floating or compensating piston at the other end of the structure, exposed to the pressure of drilling fluid flowing through the shock absorber body, to equalize the internal oil or fluid pressure with the drilling fluid pressure and compensate for oil leakage. Thus, wear is minimized. In addition, the movement of the internal oil or hydraulic fluid during telescopic extension or contraction of the shock absorber is restricted and may retard fluid transfer and thereby tend to retard telescopic movement of the shock absorber.

The essence of the invention resides in the provision in a shock absorber structure for use in a well drilling string of a second spring means or unit which acts to cushion vibratory motion when the shock absorber is in the tensioned condition, in addition to the usual spring means provided in the shock absorber for absorbing vibratory motion when the shock absorber is in the compressed condition.

This invention possesses many other advantages, and has other purposes which may be made more clearly apparent from a consideration of a form in which it may be embodied. This form is shown in the drawings accompanying and forming part of the present specification. It will now be described in detail, for the purposes of illustrating the general principles of the invention; but it is to be understood that such detailed description is not to be taken in a limiting sense.

Referring to the drawings:

FIG. 1 is a view diagrammatically illustrating a dual spring shock absorber according the invention installed in a rotary well drilling string and in a well bore;

FIGS. 2a, 2b, 2c and 2d, together, constitute a longitudinal section through the shock absorber in a neutral condition, FIGS. 2b through 2d being successive downward continuations of FIG. 2a;

FIGS. 3a and 3b, together, constitute a diagrammatic view showing the upper spring means in compression in response to weight applied thereto; FIG. 3b being a downward continuation of FIG. 3a;

FIGS. 4a and 4b, together, constitute a diagrammatic view illustrating the lower spring means in compression in response to fluid pressure forces acting within the shock absorber, FIG. 4b being a downward continuation of FIG. 4a; and FIG. 5 is a transverse section, taken on the line 5—5 of FIG. 2b, showing the rotary drive for the telescopic structure.

Figures 1, 3A, 3B:
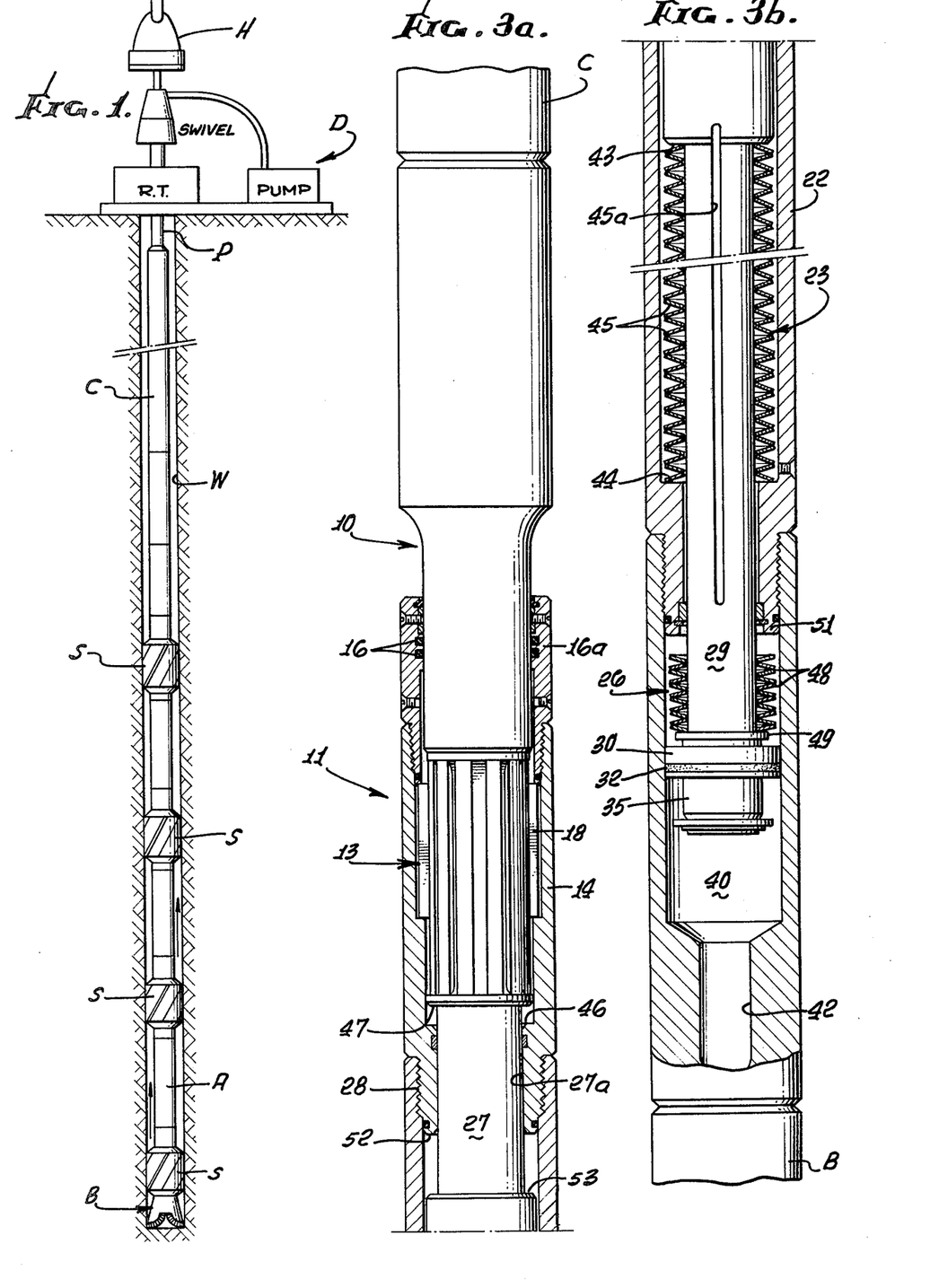

As seen in the drawings, referring first to FIG. 1, in the drilling of a well bore W into or through the earth formation, a practice involves the rotation of a drill bit B by a string of tubular drill pipe P and heavier drill collars C, supported by hoist mechanism H in a well rig D having a rotary table RT providing drive means for rotating the drill pipe and drill collars to rotate the bit. Fluid is circulated from a pump through a swivel structure suspended by the hoist mechanism, the fluid passing downwardly through the drill pipe, the drill collars and exiting through the bit to flush cuttings, as indicated by the arrows, from the well bore, as the drilling progresses. Included in the string of drill collars may be stabilizing devices S whereby the drilling direction is controlled and deflection of the bore hole is prevented, as may be caused by flexure of the drill collars in response to weight imposed on the bit. In the illustration, a shock absorber device A, in accordance with the invention is installed in the string of drill collars between a pair of vertically spaced stabilizers S close to the bit B. As is also well known, the bit B may also be rotated by a drilling fluid driven motor which is installed in the pipe string above the bit and which has a drive shaft connected to the bit. Under these circumstances the entire length of drill pipe need not be rotated. In any event, however, rotation of the bit B, particularly in certain types of formations, induces rapid vertical movement in the elastic pipe string, which can be very deleterious to the pipe connections, as well as to the bit bearings and cutters. In shallow hole drilling, such vibrations have been observed to also cause vibrations of the drilling rig itself.

In order to penetrate the earth formation, the bit depends not only upon rotation, either by the rotary drive of a rotary rig or by the more rapidly rotating down hole fluid motor drive, but the penetration rate also depends upon the application of a suitable weight to the bit, forcing the bit into the earth formation as it rotates.

In order to obviate some of the problems caused by the vertical vibrations of the drill string caused by the bit jumping off the bottom of the hole, various shock absorbing or motion dampening devices have evolved, such as those identified above, wherein various types of spring means, including metal springs, elastomeric springs and air springs, have been installed at a suitable location in the string of drill collars, say, for example just above a downhole fluid driven motor, in certain drilling operations, just above the bit in other drilling operations as illustrated herein, and elsewhere above the bit in certain other drilling operations, all depending upon the need for maintaining more or less stability of the drill collar string while damping out the vibrations caused by bit rotation.

While such shock absorbing devices have been more or less effective for their intended purposes, problems nevertheless have existed, for example, when the well bore is relatively shallow, or during certain other types of drilling operations such as bore hole enlargement and directional drilling, during which it is difficult or impractical to apply adequate weight to the bit to cause effective penetration rates.

Referring to FIGS. 2a through 2d, the improved shock absorber of the invention will be seen to include an elongated inner body structure 10 telescopically engaged within an external housing structure 11. At its upper end the body 10 has a threaded joint 10a with the upwardly extending drill collar string C, and at its lower end the outer housing 11 has a threaded pin 12 for connection with the downwardly extending drill collar string or to the bit or other drilling unit below the shock absorber assembly.

Figures 2A, 2B:
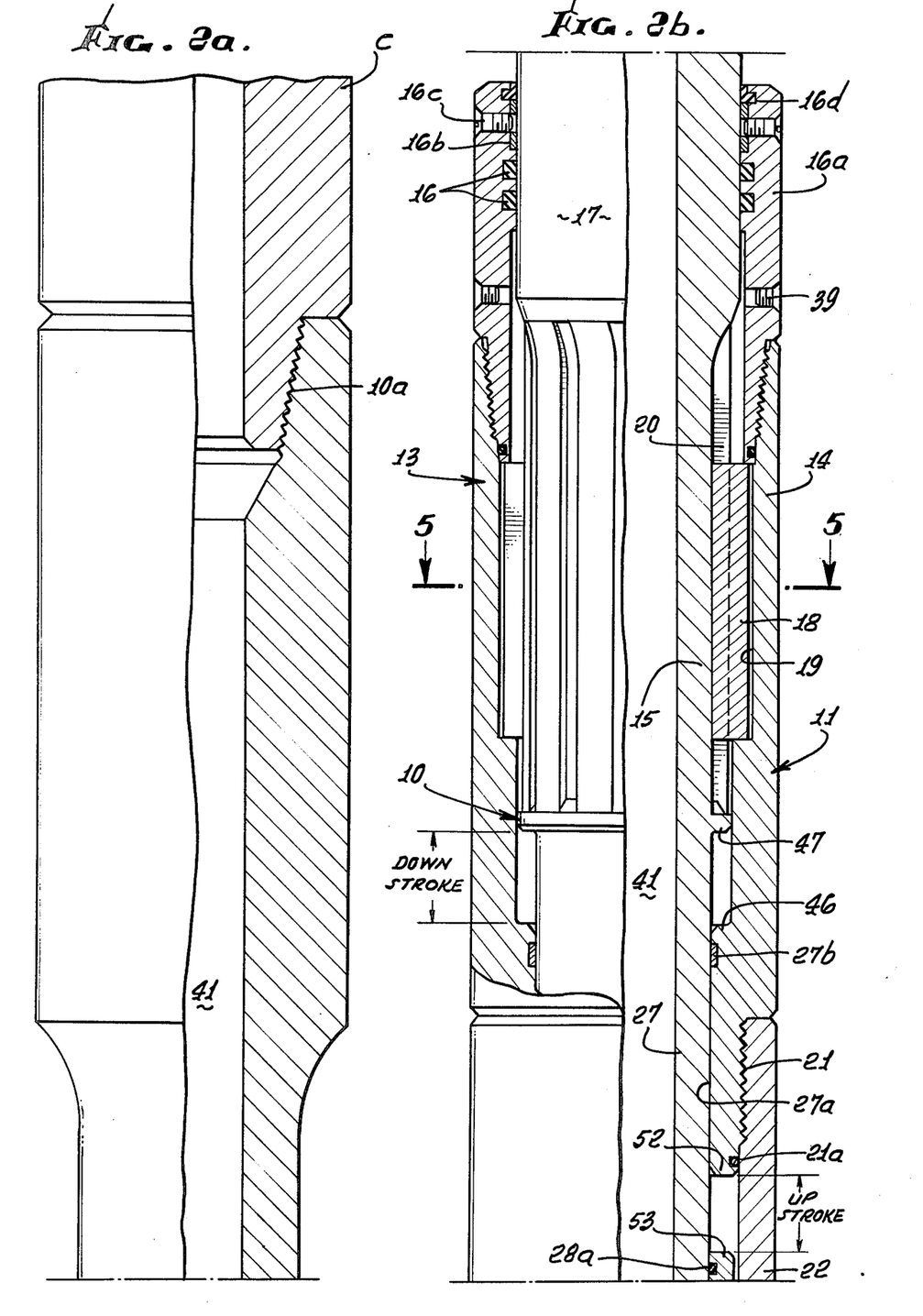

The body and housing assembly includes a rotary drive section 13 comprising an upper tubular housing section 14 slidably receiving an upper inner body section or male spline unit 15 suitable side ring sealing means 16 are carried by the housing section 14 and slidably and sealingly engage a cylindrical portion 17 of the body section 15. The seal rings 16 are disposed in a cylindrical guide section 16a of the housing which closely fits the cylindrical exterior of the body portion 17. A wear ring is mounted in the guide portion 16a by screws 16c, and a suitable wiper 16d is carried by the guide section 16 and circumferentially extends about the body section 17 at the location where it enters and leaves the housing during operation of the shock absorber. A number of circumferentially spaced and elongated keys or spline inserts 18 are disposed in longitudinally extended and circumferentially spaced recesses or grooves 19 in the body section 14, these keys or spline inserts slidably engaging in splines 20 extending longitudinally of the male spline or upper body section 15, whereby the body 10 can transmit torque to the housing structure 11, while the body and housing are permitted to also telescopically shift.

At its lower end, the upper housing section 14 has a threaded connection 21 within the upper end of a further downwardly extended tubular bowl or housing section 22 for upper spring means 23, the connection being sealed by an elastomeric seal ring 21a. At its lower end, the bowl or housing section 22 has a threaded connection 24, sealed by a elastomeric seal ring 24a with a further downwardly extended bottom sub or housing section 25 which contains lower spring means 26. The male spline or upper body member 15 has a downwardly extended cylindrical section 27 to the lower end of which is theadly connected at 28 the upper end of a further downwardly extending body section or mandrel 29, a resilient ring 28a sealing the joint 28.

Figures 2C, 2D:
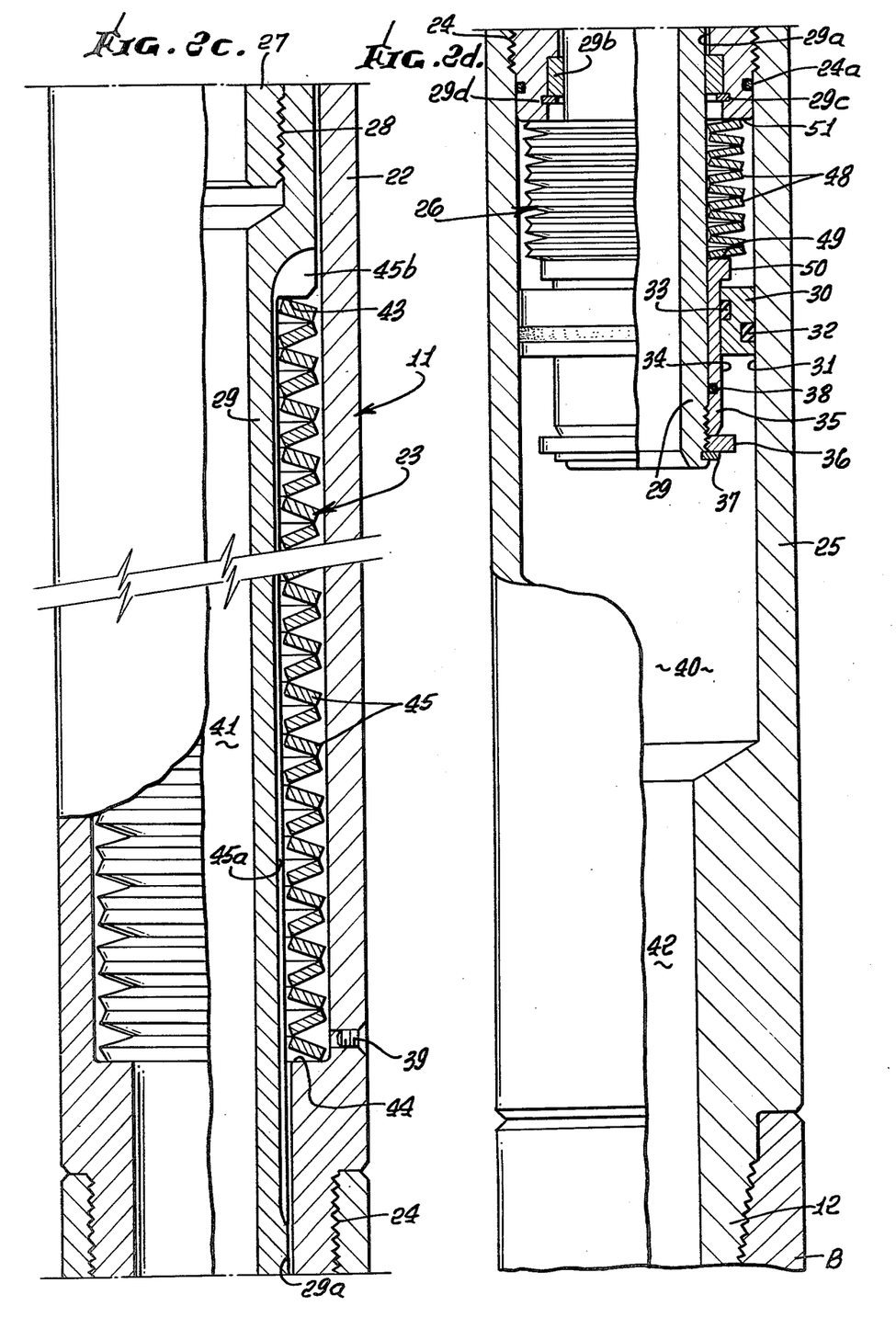

At the lower end of the body or mandrel section 29 is an annular sealing sleeve or piston 30 disposed within the annular space between the body section 29 and the internal cylindrical wall 31 of the lower housing section 25. The sealing sleeve or piston 30 has an external side ring seal 32 slidably and sealingly engaged within the housing wall 31 and an inner side ring seal 33 slidably and sealingly engaged with an external cylindrical surface 34 provided at the lower end of the inner body section 29. In the specific form shown this cylindrical sealing surface 34 is provided on a spring seating or retaining sleeve 35 threaded at 36 onto the lower end of the mandrel section 29 and retained in place by a retainer nut 36, also threaded on the mandrel 29, and a lower lock or retainer ring 37, which seats in the mandrel 29 below the nut 36 B between the spring or seating sleeve 35 and the mandrel 29 is a suitable sealing ring 38 to prevent fluid from bypassing the sealing sleeve.

It will now be recognized that the lower sealing sleeve or piston 30 and the upper or top seal means provided by the sealing ring means 16, between the upper body section 17 and the upper housing section 14, effectively define therebetween a closed space which can be filled with hydraulic fluid or lubricating fluid by means of suitable fill and vent holes in the outer housing at appropriate locations and closed by closure plugs 39 following filling of the annular space. Since the sealing or piston member 30 is of annular form and has equal areas exposed to the space between the body and the housing and to the bore 40 within the bottom sub 25, below the body structure the lubricant or hydraulic fluid within the annular space between the lower and top seals will be maintained at a pressure corresponding to the pressure of fluid in the bottom sub bore 40, and the bottom seal can compensate for loss of hydraulic fluid or lubricant from the shock absorber during use.

Extending longitudinally through the inner body structure 10 is an elongated fluid passage 41 which communicates with the drill collars extending upwardly from the connection 11 and with the bore 40 in the bottom sub 25. The bottom sub has a downwardly extended fluid passage 42 which communicates with the downwardly extended drill collar string or with the bit, whereby drilling fluid circulated downwardly from the pump through the drill pipe and drill collar string passes downwardly through the shock absorber assembly and can discharge from the usual bit orifices or nozzles, to flush cuttings from the well bore as the drilling progresses.

Drilling weight applicable to the bit is adapted to be transmitted through the upper spring means 23. Thus the mandrel or body section 29, below its connection 28 (FIG. 2c) with the lower end 27 of the spline body section, has a downwardly facing shoulder 43 opposed by an upwardly facing shoulder 44 within the mandrel. The upper spring means 23 is disposed between the shoulders 43 and 44 and comprises a plurality of spring elements 45. In the preferred form, these spring elements 45 are in the form of stacked Bellville springs or dished springs which are very durable and have a substantially constant spring rate. Other spring elements may be employed in the upper spring means, such as those well known in the art, including the elastomeric spring rings and metal separator members of the above-identified Christensen "SHOCK-EZE" shock absorber. The Bellville springs are preferable where relatively high temperatures may be encountered, over the working range of the elastomeric material. The stroke of the inner body and housing in a direction to compress the upper spring means 23 is limited by an upwardly facing shoulder 46 (FIG. 2b), in the spline housing section 14, which is opposed by a downwardly facing shoulder 47 on the male spline or body member 15. The gap between these opposing shoulders 46 and 47 is designated in FIG. 2A and will be later referred to as "DOWN STROKE." The Belleville springs 45, during operation of the shock absorber, as will be later described, are normally effective to resiliently resist movement of the shoulders through the full length of the downstroke.

The lower spring means 26 also comprises a stack of spring elements 48, also preferably of the dished spring or Bellville spring type. These spring elements 48 are interposed between an upwardly facing shoulder 49, provided on an upper flange 50 of the spring retainer sleeve 35, and a downwardly facing shoulder 51 provided at the lower end of the upper spring bowl or housing section 22, at the joint 24 with the lower spring housing section 25. Compression of the lower spring means 26, in response to tension applied to the shock absorber unit, or telescopic extension of the unit, is limited by a downwardly facing shoulder 52 provided at the lower end of the upper splined housing section 14, at the connection 21 with the upper spring bowl or housing section 22, and an upwardly facing shoulder 53 provided on the upper end of the lower body or mandrel section 29 at the joint 28 with the lower end 27 of the splined mandrel or upper body section. The gap between the opposing shoulders 52 and 53 is designated "UP STROKE." These shoulders 52 and 53 can also function to effect a jarring action in the event that the bit becomes stuck in the hole. The extension of the shock absorber during such jarring operations does not fully deform the lower spring means, however.

When the shock absorber unit is in the neutral condition shown in FIGS. 2a through 2d, both of the compression spring sets 23 and 26 are expanded, and the unit is capable of downstroke or upstroke. It will be appreciated that by appropriate selection of spring elements and spacings between the parts, that the upper and lower springs can be preloaded one against the other. In addition, it will be apparent that by selection of spring washers in the respective upper and lower spring means, that the spring rate of the upper and lower spring means can be different, if desired.

Flexibility of elongated units within a well drilling pipe string can result in difficulties in terms of directional control, and deviation of the well bore can occur upon the flexure of such a drilling unit. Since telescopic shock absorber units are in general, due to their wall thicknesses, less rigid than regular drill collars, the present shock absorber device is constructed in such a manner that the inner body structure and outer housing structure have longitudinally spaced support regions. The cylindrical section 17 of the male spine unit slidably and closely fits within the sealed, upper end of the housing, while the lower cylindrical end 27 of the splined mandrel or body section closely slidably extends through the bore 27a provided at the connection 21 between the upper housing section and the upper spring bowl or housing section 22. In addition, within the bore 27a one or more wear rings or bushings 27b may be provided, composed of wear resistant material. Likewise, the lower spring mandrel or body section 29 slides through a cylindrical bore 29a provided at the lower end of the upper spring bowl or housing section 22, and a suitable wear ring or bushing of wear resistant material 29b is installed between the mandrel and the housing, being retained in place by a suitable snap or stop ring 29c in a seat 29d. Thus, the telescopic body and housing structures are supported to resist bending at a plurality of longitudinally spaced locations.

Since telescopic contraction of the body and housing causes a transfer of the internal lubricant or hydraulic fluid through the bores 27a and 29a, by reason of the displacement of fluid by the cylindrical male spine section 17 below the top seal means 16, the restriction to flow produced by the close fit between the upper body section 27 in the bore 27a and wear ring 27b, and the mandrel 29 in the wear bushing 29b in bore 29a can cause a certain amount of resistance to the transfer of the lubricant or hydraulic fluid, thereby affording a fluid damping of the vibratory motion produced during the drilling operation. Fluid must also transfer through the spring units 23 and 26. To prevent trapping of fluid by the Belleville springs 45, the mandrel section has suitable by pass passages 45a therein, extending longitudinally from notches 45b in the mandrel shoulder 43 to a location below the shoulder 44 in the housing. Other, restricted flow passages may be provided in the wear bushings 27b and 29b.

During the drilling operation, as drilling fluid as being circulated by the pump downwardly through the drill pipe and drill collars, through the shock absorber passages 41 and 42 and through the chamber 40 in the bottom sub, there is a differential pressure, greater than the pressure in the annulus outside of the shock absorber apparatus, which is caused by the restriction to flow through the usual bit nozzles or orifices. This differential pressure may be substantial, say on the order of 1,000 PSI, more or less. The body structure 10 being sealed within the top seal 16 provides a substantial piston area or pressure responsive area which is subjected to this high differential pressure tending to effect telescopic extension of the shock absorber unit. If it is assumed that the differential pressure internally of the housing, acting over this pressre responsive area of the body, creates an upward force on the body structure 10 in excess of the downward force applied by the drill collar string C above the body structure 10, then the shock absorber cannot operate effectively in a downstroke direction to apply compressive force to the upper spring means 23. The upper spring means, under these circumstances, can be rendered inoperative for the intended purpose of absorbing rapid vertical vibration and shock induced by rotation of the drill bit on the bottom of the bore hole. Such circumstances can arise when the drilling operation is in the top of a bore hole, so that inadequate drill collar weight can be installed in the drill collar string to overcome the effect of the differential pressure acting upwardly on the drill collar string to overcome the applied weight. Other circumstances can impose a limitation on the amount of applied weight, such as when the bore hole is being enlarged by an underreaming bit, or where directional control is necessary and higher weight cannot be applied through the shock absorber to the bit, without giving rise to the possibility of deviation of the bore hole or the inability to maintain a desired directional drilling course. It is under these circumstances that the lower spring means 26 become very important to the maintenance of the cushioning action in the shock absorber, to prevent the rapid vertical motion or vibration of the entire drill string.

As seen in FIGS. 3a and 3b, the effect of fluid pressure in housing chamber 40 and acting on the effective area of the body 10 within the top seal 16 is overcome by the weight of the drill string applicable downwardly on the body to resiliently deform the upper spring means 23. Weight is therefore transmitted to the bit through the spring means 23 which can act to cushion upward accelerations of the housing as the bit rotates and tend to hold the bit on the bottom of the hole. In this respect the shock absorber acts in the manner of those typical in the prior art.

Figure 4A:
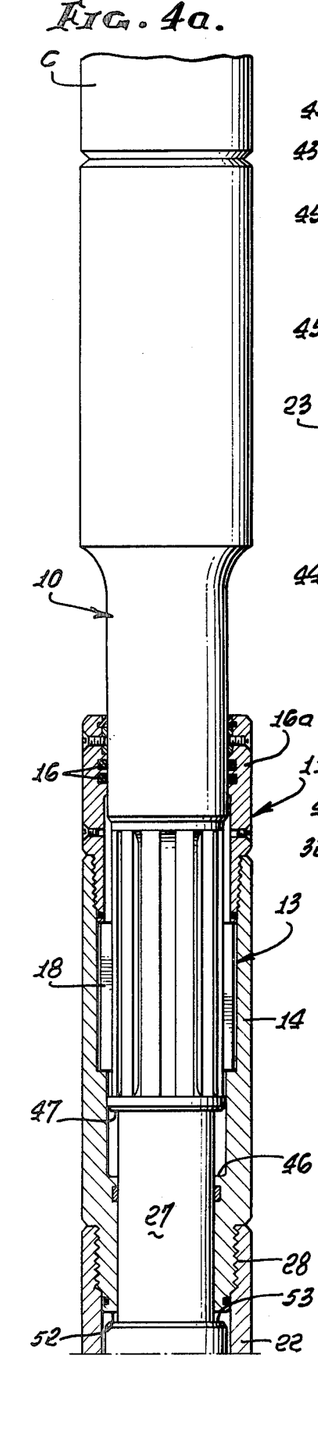
Figures 4B, 5:
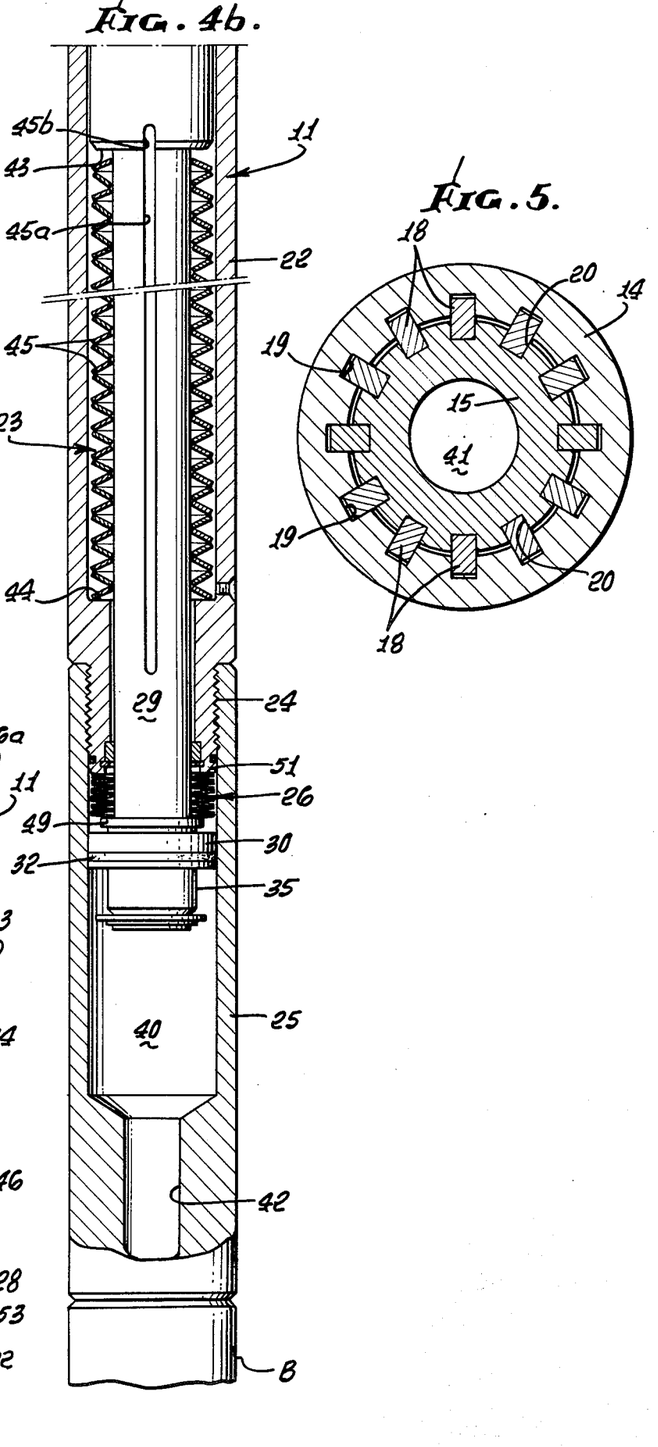

However, as seen in FIG. 4a and 4b, the shock absorber body and housing have been telescopically extended by relative movement in an upstroke direction in response to fluid pressure in housing chamber 40 producing a force on the body upwardly in excess of the applied weight, thereby the spring elements 48 of the lower spring means 26 function to resiliently cushion vibratory or vertical motion of the housing, and the thrust applied to the bit can nevertheless be effective to cause penetration of the earth formation, notwithstanding the fact that such thrust is not being applied to the bit through the drill collar string extending upwardly from the shock absorber. Under these circumstances, with the lower spring means 26 under compression, downward force or thrust is applied to the bottom sub, to in turn apply weight or thrust to the bit, which is derived from the pressure within the bottom sub chamber 40 acting, not only upwardly on the internal body piston area, but also downwardly on the internal effective housing piston area or fluid pressure responsive area to cause telescopic extension of the shock absorber unit against the resilience of the lower spring means 26, and the connection through the shock absorber assembly between the body and the housing is resiliently cushioned by the lower spring means 26.

Thus, it is apparent that the present invention provides a novel drill string shock absorber construction for cushioning the rapid vibratory or vertical shock loading of the drill string, by providing, in combination, a first cushioning spring means which is effective when the shock absorber assembly is telescopically contracted or operating in compression, and another resilient spring means which is operative when the shock absorber assembly is telescopically extended or operating in tension. More particularly, both spring means are compression spring means which can be of selected equal or different spring rates. When Bellville springs are employed as the spring elements in the respective spring means, the spring means also have advantageous relatively uniform spring rates, and the spring means are durable and relatively temperature and pressure insensitive as compared with eleastomeric and gas springs.

I claim:

1. A shock absorber for well drilling strings comprising: an enlongated telescopic structure including an inner tubular body and an outer housing having means for connecting said structure in a well drilling string for conducting well drilling fluid through said structure; rotary drive means between said body and said housing; and first and second compression spring means in said housing engageable between said body and said housing for alternately cushioning telescopic contraction and extension of said structure.

2. A shock absorber as defined in claim 1; said first and second spring means being compression spring means formed by a stack of annular spring elements, said body and said housing providing opposing shoulders at opposite ends of each stack and movable towards one another to compress the respective stack upon telescopic contraction and extension of said structure.

3. A shock absorber as defined in claim 1; said first and second spring means being compression spring means formed by a stack of annular spring elements, said body and said housing providing opposing shoulders at opposite ends of each stack and movable towards one another to compress the respective stack upon telescopic contraction and extension of said structure, said spring elements being Belleville springs.

4. A shock absorber as defined in claim 1; seal means in longitudinally spaced relation between said body and said housing; said rotary drive means and both of said spring means being located between said seal means; and including means enabling filling the space between said seal means with a clean hydraulic fluid.

5. A shock absorber as defined in claim 1; seal means in longitudinally spaced relation between said body and said housing; said rotary drive means and both of said spring means being located between said seal means; and including means enabling filling the space between said seal means with a clean hydraulic fluid; said body having a free end in said housing; one of said seal means being a slidable seal sleeve between said body adjacent said free end and said housing for equalizing the pressure in said space with the pressure in said housing at said free end of said body.

6. A shock absorber as defined in claim 1; seal means between said body and said housing; said body extending through said seal means into said housing.

7. A shock absorber as defined in claim 1; seal means between said body and said housing; said body extending through said seal means into said housing; and including second seal means floating between said body and said housing in spaced relation to the first-mentioned seal means; said rotary drive means and said spring means being between said seal means; and means for filling the space between said seal means with a clean lubricant.

8. A shock absorber as defined in claim 1; said body and said housing having a first pair of opposed shoulders; said first spring means being compressible between said first shoulders; said body and said housing having a second pair of opposed shoulders; said second spring means being compressible between said second shoulders.

9. A shock absorber as defined in claim 1; said body and said housing having a first pair of opposed shoulders; said first spring means being compressible between said first shoulders; said body and said housing having a second pair of opposed shoulders; said second spring means being compressible between said second shoulders; said spring means each being formed by a set of annular spring elements.

10. A shock absorber as defined in claim 1; said body and said housing having a first pair of opposed shoulders; said first spring means being compressible between said first shoulders; said body and said housing having a second pair of opposed shoulders; said second spring means being compressible between said second shoulders; said spring means each being formed by a set of annular spring elements including stacked Belleville springs.

11. A shock absorber as defined in claim 1; said body and said housing having axially opposed shoulders engageable to limit telescopic extension and contraction of said structure.

12. A shock absorber as defined in claim 1; said body and said housing having a first pair of opposed shoulders; said first spring means being compressible between said first shoulders; said body and said housing having a second pair of opposed shoulders; said second spring means being compressible between said second shoulders; and additional opposed shoulders held spaced by said spring means and engageable upon telescopic extension and contraction of said structure to limit compression of said spring means.

13. In a shock absorber for well drilling strings; an elongated tubular body; an elongated tubular housing telescopically receiving said body; said body having one end projecting from one end of said housing and provided with means connectable to the drilling string; the other end of said housing having means connectable to the drilling string; first sealing means engaged between said body and said housing at said one end of said housing; second sealing means slidably engageable between said body and said housing adjacent the other end of said body; means permitting the filling of said housing with a lubricant between said sealing means;

rotary drive means and spring means between said body and said housing intermediate said sealing means for transmitting torque therebetween and cushioning telescopic movement thereof: said spring means comprising first and second compression spring means alternately compressible upon telescopic compression and extension of said body and said housing.

14. In a shock absorber as defined in claim 13; said body and said housing having axially opposed and spaced first shoulders; said first spring means being disposed between said shoulders; said body having second axially opposed and spaced shoulders respectively facing oppositely from first shoulders; said first spring means being compressably disposed between said first shoulders; said second spring means being compressably disposed between said second shoulders.

15. In a shock absorber as defined in claim 13; said body and said housing having axially opposed and spaced first shoulders; said first spring means being disposed between said shoulders; said body having second axially opposed and spaced shoulders respectively facing oppositely from first shoulders; said first spring means being compressably disposed between said first shoulders; said second spring means being compressably disposed between said second shoulders; said body and said housing having additional shoulders normally axially spaced by said spring means and engageable to limit compression of said spring means.

16. In a shock absorber as defined in claim 13; said body and said housing having axially opposed and spaced first shoulders; said first spring means being disposed between said shoulders; said body having second axially opposed and spaced shoulders respectively facing oppositely from first shoulders; said first spring means being compressably disposed between said first shoulders; said second spring means being compressably disposed between said second shoulders, said spring means being stacked Belleville springs.

17. In a shock absorber as defined in claim 13; said body and said housing having axially opposed and spaced first shoulders; said first spring means being disposed between said shoulders; said body having second axially opposed and spaced shoulders respectively facing oppositely from first shoulders; said first spring means being compressably disposed between said first shoulders; said second spring means being compressably disposed between said second shoulders, said spring means being stacked Belleville springs; and including means enabling the bypass of fluid in said housing around said Belleville springs of said first spring means.

18. In a shock absorber as defined in claim 13; said body and said housing having slidably interfitting portions providing axially spaced supports to inhibit bending; said portions restricting the transfer of lubricant in said housing during telescopic extension and contraction.

19. In a shock absorber as defined in claim 13; coengageable jarring means between said body and said housing engageable upon telescopic extension and contraction of said body and said housing.

20. In a shock absorber for well drilling strings; an elongated tubular body; an elongated tubular housing telescopically receiving said body; said body having one end projecting from one end of said housing and providing with means connectable to the drilling string; the other end of said housing having means connectable to the drilling string; first sealing means engaged between said body and said housing at said one end of said housing; second sealing means slidably engageable between said body and said housing adjacent the other end of said body; means permitting the filling of said housing with a lubricant between said sealing means; rotary drive means and spring means between said body and said housing intermediate said sealing means for transmitting torque therebetween and cushioning telescopic movement thereof, said spring means comprising compression spring means, said body and said housing having areas responsive to pressure entering said housing from the other end of said body tending to telescopically extend said body and said housing and compress said spring means.

21. In a shock absorber as defined in claim 20; said spring means being stacked Belleville springs.

22. A shock absorber for well drilling strings comprising: an elongated telescopic structure including an inner tubular body and an outer housing having means for connecting said structure in a well drilling string for conducting well drilling fluid through said structure; rotary drive means between said body and said housing; and compression spring means in said housing engageable between said body and said housing for alternately cushioning telescopic contraction and extension of said structure.

23. A shock absorber as defined in claim 22; said spring means being compression spring means formed by a set of annular spring elements, said body and said housing providing opposing shoulders at opposite ends of said spring means and movable towards one another to compress said spring elements upon telescopic contraction and extension of said structure.

24. A shock absorber as defined in claim 22; seal means in longitudinally spaced relation between said body and said housing; said rotary drive means and said spring means being located between said seal means; and including means enabling filling the space between said seal means with a clean hydraulic fluid; said body having a free end in said housing; one of said seal means being a slidable seal sleeve between said body adjacent said free end of said body and said housing for equalizing the pressure in said space with the pressure in said housing at said free end of said body.

25. A shock absorber as defined in claim 22; seal means between said body and said housing; said body extending through said seal means into said housing.

26. In a shock absorber for well drilling strings; an elongated tubular body; an elongated tubular housing telescopically receiving said body; said body having one end projecting from one end of said housing and provided with means connectable to the drilling string; the other end of said housing having means connectable to the drilling string; first sealing means engaged between said body and said housing at said one end of said housing; second sealing means slidably engageable between said body and said housing adjacent the other end of said body; means permitting the filling of said housing with a lubricant between said sealing means; rotary drive means and spring means between said body and said housing intermediate said sealing means for transmitting torque therebetween and alternately cushioning telescopic movement thereof upon telescopic compression and extension of said body and said housing.

27. In a shock absorber as defined in claim 26; said body and said housing having axially opposed shoulders therein relatively axially movable upon telescopic extension and contraction of said body and said housing, said spring means being between said shoulders.

28. In a shock absorber as defined in claim 27; said spring means being stacked annular spring elements.

29. In a shock absorber as defined in claim 27; said spring means being stacked Bellville springs.

* * * * *

UNITED STATES PATENT AND TRADEMARK OFFICE
CERTIFICATE OF CORRECTION

PATENT NO. : 4,186,569
DATED : Feb. 5, 1980
INVENTOR(S) : James T. Aumann

It is certified that error appears in the above-identified patent and that said Letters Patent are hereby corrected as shown below:

Change the patent date on the first page of the patent from "Feb. 5, 1979" to --Feb. 5, 1980--

Signed and Sealed this

Tenth Day of November 1981

[SEAL]

Attest:

GERALD J. MOSSINGHOFF

Attesting Officer

Commissioner of Patents and Trademarks